April 13, 1954   G. V. CONSTANTAKIS   2,675,075
TIRE TREAD LACERATING APPARATUS
Filed Feb. 9, 1952
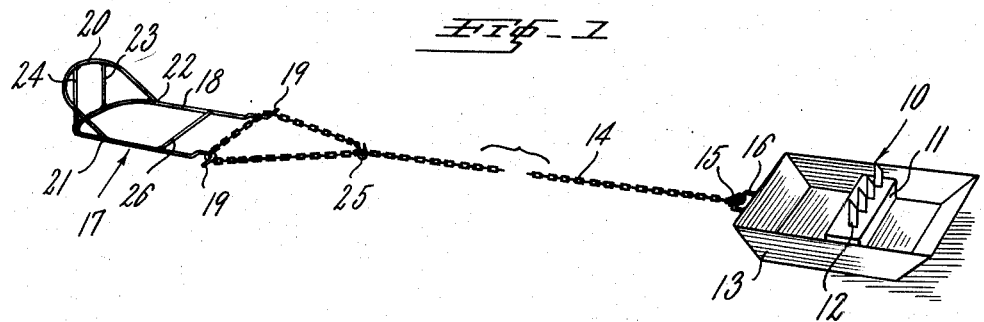
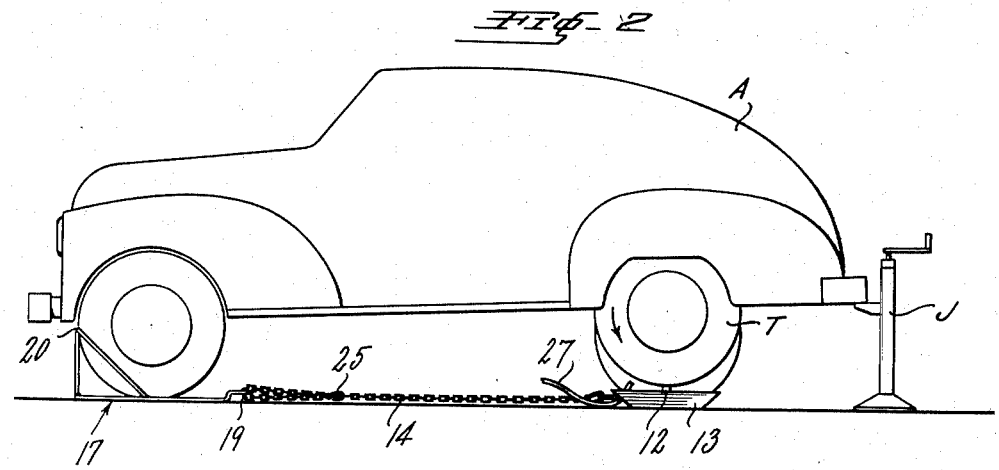
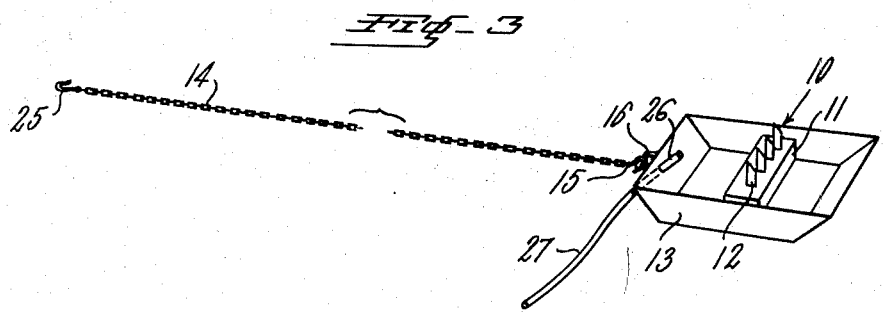
INVENTOR.
GEORGE V. CONSTANTAKIS
BY
ATTORNEY Patented Apr. 13, 1954

2,675,075

UNITED STATES PATENT OFFICE 2,675,075

TIRE TREAD LACERATING APPARATUS

George V. Constantakis, Allen Park, Mich., assignor to United States Rubber Company, New York, N. Y., a corporation of New Jersey Application February 9, 1952, Serial No. 270,882

3 Claims. (Cl. 164—38)

This invention relates to apparatus for lacerating the tread of a rubber vehicle tire to increase the traction thereof.

It is one object of the invention to provide a tire tread lacerating apparatus which may be used to lacerate the tread of a tire while it is mounted on an automobile.

Another object of the invention is to provide a tire tread lacerating apparatus which is of simple, inexpensive construction and which may be used by comparatively unskilled operators.

Other objects and advantages of the present invention will become apparent from the following description when read in conjunction with the accompanying drawing herein.

Figure 1 is an isometric view of one embodiment of the present invention.

Figure 2 is an elevational view showing the embodiment of Figure 1 as used to lacerate a tread of a tire while the tire is mounted on an automobile.

Figure 3 is an isometric view of a modified form of the present invention in which a spray nozzle and hose is provided.

Referring in particular to Figure 1 of the drawing, there is shown one embodiment of the present invention. This embodiment includes a lacerating tool 10, which in the form shown consists of a block 11 having a plurality of space parallel cutting blades 12 secured thereto and extending up therefrom. It is to be understood that the particular type lacerating tool shown in the drawing is for the purpose of illustration only and that any other suitable type of lacerating tool could be used. For example the lacerating tool shown in my co-pending application, Serial No. 270,883, filed February 9, 1952, could be used in place of that shown in Figure 1.

The lacerating tool 10 is secured in an open pan or container 13 which as will later be brought out is used to carry a cooling and lubricating liquid.

A chain 14 is secured at one end to the pan 13 by means of a hook 15 secured to the end of the chain and an eye 16 secured to the pan 13. The other end of the chain 14 is secured to a wheel chock 17. In the particular form shown the chock 17 is of an open welded pipe construction to give it lightness. The chock includes an elongated U-shaped pipe section 18 having chain receiving hooks 19 formed at the end of the straight portions. A second U-shaped section 20 is welded to the section 18 at points 21 and 22 and slopes upwardly therefrom. Two braces 23 and 24 welded at each end to sections 18 and 20 support the curved portion 20 of the section 20 at a fixed distance above the curved portion of the section 18. The chain 14 has a second hook 25 secured to the opposite end thereof from the hook 15. The chain 14 passes through the hook 19 on the section 18 and is hooked on itself by means of the hook 25. The effective length of the chain between the chock 17 and the pan 13 can, therefore, be varied depending on the point on the chain that the hook 25 is engaged. A brace 26 prevents the hooks from being forced together under the influence of the chain.

Referring to Figure 2, there is shown the mode in which the apparatus of Figure 1 is used to lacerate the tread of a tire T while it is mounted on an automobile A. As shown, the chock 17 is placed under and in front of the front wheels of the automobile A with the section 20 bearing on the tire at the frontmost part of the tire. The back wheel carrying the tire T is jacked up from the ground by a jack J and the pan 13 with the lacerating tool therein is placed directly beneath the hub of the wheel and beneath the tread of the tire. The chain 14 is adjusted so that there is no slack therein when the chock and pan are in these positions. The pan 13 is filled with a lubricant such as water. To obtain more complete lubrication of the tread the pan may be equipped with a spray nozzle 26 secured in one side wall thereof and directed toward the tread of the tire and a connecting hose 27 as shown in Figure 3 by which a continuous spray of lubricant such as water may be directed against the tire tread during the lacerating operation. The engine of the automobile is then operated to rotate the tire T and the wheel carrying the tire is gradually lowered by the jack to bring the tread of the tire into contact with the blades 12 of the lacerating tool 10 so that the tread is lacerated thereby. The tread of the tire picks up some of the liquid from the pan 13 or is sprayed by the nozzle 26 so that it is cooled and lubricated as it is lacerated. The tire is gradually lowered until the tread is lacerated to the desired depth. Depth of laceration may be controlled by setting the height of the blades 12 above the top face of the block 11 to the depth of laceration desired. The chain 14 and chock 17 anchor the pan 13 and tool against movement due to the forces exerted thereon when the tread of the tire contacts the lacerating tool.

Instead of lowering the tire by means of the jack, the lacerating operation may be carried out according to the method set forth in my copending application, Serial No. 270,881, filed February 9, 1952. According to this method the tire is not lowered against the lacerating tool, but is held adjacent to the lacerating tool and rotated at a sufficient speed to expand the tire radially by centrifugal force so that the tread thereof is fed against the lacerating tool.

It is to be understood that the chain 14 may be connected directly to a part of the automobile such as the frame or the front axle by the hook 25 and the apparatus otherwise utilized as previously described. However as it is desirable to always chock the car, the chock 17 provides a convenient anchor to which the chain 14 may be connected.

From the above description it can be seen that there is provided a simple, inexpensive tire tread lacerating apparatus which can be used by comparatively unskilled operators to increase the tread traction of automobile tires while they are still mounted on the automobile.

It is to be understood that the above description and accompanying drawing is for the purpose of illustration only and not by way of limitation and that changes and modifications may be made therein without departing from the spirit and the scope of the invention.

Having thus described my invention, what I claim and desire to protect by Letters Patent is:

1. Apparatus for lacerating the tread of a tire while the tire is mounted on a vehicle comprising, a lacerating tool adapted to be placed beneath the tread of a tire carried by a jacked-up wheel, chock means adapted to be placed against the tire of another of the wheels of the vehicle to prevent movement of the vehicle, and an elongated connecting member connecting the chock means and the lacerating tool together to anchor the lacerating tool against movement due to the forces exerted thereon when the tread of the tire of the jacked-up wheel is brought into contact with the lacerating tool and the wheel is rotated.

2. Apparatus for lacerating the tread of a tire while the tire is mounted on a vehicle comprising, a lacerating tool adapted to be placed beneath the tread of a tire carried by a jacked-up wheel of the vehicle, a spray nozzle secured to said tool for spraying cooling liquid on the lacerating tool and the tread of the tire, means for connecting said nozzle to a source of cooling and lubricating liquid, chock means adapted to be placed against the tire of another of the wheels of the vehicle to prevent movement of the vehicle, and an elongated connecting member connecting the chock means and the lacerating tool together to anchor the lacerating tool against movement due to the forces exerted thereon when the tread of the tire of the jacked-up wheel is brought into contact with the lacerating tool and the wheel is rotated.

3. Apparatus for lacerating the tread of a rubber tire while it is mounted on the wheel comprising, an open pan for receiving a cooling and lubricating liquid adapted to be placed under a jacked-up wheel of the vehicle, a spray nozzle mounted on the pan, means for connecting said nozzle to a source of cooling and lubricating liquid, a lacerating tool having lacerating elements extending therefrom secured in said pan with the lacerating elements extending away from the bottom of the pan, a connecting member secured at one end to the pan and having means at the other end for connecting said connecting member to a part of the vehicle whereby when the tread of the rubber tire of the jacked-up wheel is rotated and brought into contact with the lacerating tool, the pan and lacerating tool will be anchored against movement by the forces exerted thereon by the rotating tire.

References Cited in the file of this patent

UNITED STATES PATENTS

| Number | Name | Date |
|---|---|---|
| 596,336 | Norton | Dec. 28, 1897 |
| 1,424,472 | Goldberg | Aug. 1, 1922 |
| 1,567,472 | Skiles | Dec. 29, 1925 |
| 2,003,630 | Errig et al. | June 4, 1935 |
| 2,061,581 | Lippincott | Nov. 24, 1936 |
| 2,180,556 | Sipe | Nov. 21, 1939 |
| 2,350,375 | Stephens | June 6, 1944 |

FOREIGN PATENTS

| Number | Country | Date |
|---|---|---|
| 207,174 | Switzerland | Dec. 16, 1939 |